Patented Jan. 15, 1935

1,987,893

UNITED STATES PATENT OFFICE 1,987,893

HONEY PROCESS AND PRODUCT

Elton James Dyce, Ithaca, N. Y., assignor to Cornell University, Ithaca, N. Y., a corporation of New York No Drawing. Application March 26, 1931, Serial No. 525,616

10 Claims. (Cl. 99—11)

The use of natural honey as a food has been retarded by the fact that it either tended to become gritty, thru the formation of crystals of dextrose hydrate having varying degrees of coarseness, or if the tendency to crystallization was reduced by the heating method commonly used, the honey in liquid form was of a consistency difficult to spread on bread or use at the table without dripping.

While it has been known that natural honey that happened to form finer crystals had a more pleasing quality than when the crystals were coarser, the fact that the crystalline structure could not be definitely controlled by the producer, and that varying sizes of crystals would occur, which would sometimes even render the honey unmarketable, has directed most of the processes toward preventing crystallization, as by heating it instead of toward encouraging or controlling crystallization. Fermentation was also more common when crystals were present, and the ordinary heating not only eliminated the crystals but also destroyed the yeasts usually present in natural honey which cause it to ferment.

The primary object of the present invention is to produce honey having a smooth, firm, fondant-like consistency which can be definitely controlled and produced as a commercial product, and which will be substantially free from fermentation. The product is smooth and uniform, even when low grade honeys are used, and is characterized by uniformly distributed crystals exceedingly minute in size, which not only give it a pleasing fondant-like consistency, but also seem to improve the flavor and palatability. The product is substantially stable under ordinary conditions and does not readily ferment.

In the preliminary steps of my process the honey is heated to about 160 degrees F., or to such a temperature as is adequate to insure that the yeasts contained in the honey, if any, have been destroyed. This heating is a desirable preliminary step since in my final product the crystallization of the honey is so complete as to favor fermentation if yeasts were still present. This heating also liquefies or dissolves any of the crystals which might have already formed in the honey, or which might have been present in the honey at the time of its extraction from the comb. Honey thus heated will usually granulate slowly and with coarse, gritty crystals, making undesirable honey for the market. It is therefore necessary to control this crystallization, as will be described.

After the honey has been heated to about 160 degrees F., to destroy the yeasts and dissolve existing crystals, it should be cooled as quickly as possible so as to reduce the possibility of darkening the honey due to the break-down of one or more of the sugars or other materials contained in honey. In practice I find it desirable to use a double tank in which the cavity containing the honey is surrounded by an outer jacket. The heating can then be done by injecting live steam into the outer jacket, provided the inner tank is lined with enamel or other material which serves partially as an insulator, and provided also that at the time of heating the honey is constantly agitated. After heating as described, the honey is then quickly cooled to about 75 degrees F. by circulating cold water in the outer jacket of the tank, at the same time agitating the honey constantly. The rapidity of cooling is greatly increased by this agitation.

The next steps have to do with controlling the crystallization so as to product the uniformly distributed exceedingly fine crystals which give the product its special fondant-like characteristics. Accordingly, the next step after cooling is to add a portion (say about 5%), of honey which has previously been put thru my process, so as to be very finely crystallized. This portion of finely crystallized honey need not be a large amount. I have used various percentages by weight of liquid and the finely crystallized honey, from as low as 1% to over 20%. From a scientific standpoint, there is no particular upper limit to the proportion of finely crystallized honey which may be added to the liquid honey to start its crystallization, as, in any case, the same product will result; but commercially, it is of course not desirable to use great proportions of the crystallized starter, as it merely results in the same honey being worked over and over again with a relatively small net yield or output. I find in general that the larger proportion of finely crystallized honey used, the more speedy is further crystal formation, due to the larger number of foci for crystal formation incorporated in the liquid honey. For practical purposes, from 3% to 10% of the added material seems in general to be preferable, and a good working rule is to add about 5%, as already indicated.

I have referred to the addition of a small quantity of honey which has already been put thru my process. However, it is not necessary that such previously processed honey be used even though it is considered preferable. I have used granulated honey in which the crystals have been crushed very fine by running them through a honey pump such as in common use in many apiaries, or by grinding the crystals in some form of mill. Since honey in which the crystals have been ground in a honey pump or mill and which has not been subject to my process may contain living yeast cells, I prefer to use honey which has been put thru my complete process as an insurance against later fermentation.

While the addition of any material other than already crystalline honey would be contrary to law in many states and countries, unless the added material was properly declared on the labels of the packages, I find it possible to incorporate air bubbles, also in some cases other sugars than those actually derived from honey. For example, I have been able to obtain a product of extreme smoothness and high quality by adding finely crystallized sugar. Usually honey which has a large amount of air bubbles incorporated in it is of undesirable quality, yet I have made a smooth granulated honey of good quality by whipping the liquid honey vigorously when crystallization was beginning, so as to incorporate many minute air bubbles.

When the finely granulated honey is added to the honey which is liquid, it is desirable that there be a thorough mixing of the two portions, so that minute crystals of dextrose hydrate shall become mixed thoroughly in all portions of the liquid honey, so that each crystal or crystal fragment may act as a separate focus of further crystallization. To bring about this desired condition, I find it desirable to agitate the entire mass of honey after the addition of the finely granulated honey, for a period of about fifteen minutes.

Since air bubbles in granulated honey may harbor yeasts which are capable of causing fermentation of honey, and since if air bubbles are present they tend to rise to the top of the honey on standing and form a scum which is somewhat objectionable in appearance, I find it desirable that the agitator used in stirring the granulated honey into the liquid shall be so situated in the tank as to stir the honey near the bottom and not too near the surface, and in such a manner as not to suck air bubbles from the top of the container. In general I find it desirable to have the agitator driven by a shaft through the side of the tank and so placed that the blades of the agitating mechanism shall be at least several inches below the surface of the honey mass.

While I have stated that after the initial heating to about 160 degrees F. to destroy yeasts, the honey should be quickly cooled to 75 degrees F. before the portion of finely granulated honey is added, yet it is not necessary that a temperature of exactly 75 degrees F. be attained. It is necessary only that the temperature be so lowered that when the finely granulated honey is added, the crystals in the added granulated honey shall not be liquefied; and in general any temperature below about 100 degrees F. will give fair results. Since the viscosity of honey rapidly increases with the lowering of its temperature, I find it desirable to bring the temperature of the cooling honey which is undergoing my process to about 75 degrees F. because at about that temperature the consistency of the honey is such that a thorough mixing of the liquid honey with the added granulated honey is easily brought about. If the temperature of the liquid honey is too low, such a mixing is considerably more difficult, and may become almost impossible at low temperatures. In common practice I find it helpful if the honey is of high consistency to introduce the portion of finely granulated honey at slightly higher temperatures than are most suitable when honeys of average water content are used, while for the thinner honeys, a slightly lower temperature than 75 degrees F. is sometimes more favorable.

After the finely granulated honey or other material is added to the liquid honey and thoroughly incorporated in the mass, the next step in the process is to put the honey at a temperature such that further formation of crystals will progress with the greatest possible rapidity. I find great variation in the effects of different temperatures in this respect. While it is often stated in bee keeping literature that fluctuating temperatures are most favorable for a rapid formation of crystals in honey, I find on the contrary that if the proper temperature is attained, a higher speed of crystal formation is possible when the temperature is fairly constant. For honeys of average consistency, I find a temperature of about 57 degrees F. to give the most rapid formation of crystals, after the nuclei for crystal formation have been thoroughly incorporated. This exact temperature is not, however, an essential to my process, for I have used with success temperatures varying over many degrees from the temperature stated above. Since the quality of the honey is improved when crystal formation is most rapid, I find it desirable to have for each honey that particular temperature most suitable for crystal formation. I find that for honeys that are below the average in consistency a temperature slightly below 57 degrees gives most rapid crystal formation, while for thicker honeys, a slightly higher temperature of about 60 degrees F. may give added speed in the process. For all types of honeys, however, I find the best results when the temperatures are maintained as nearly constant as is practicable in ordinary constant temperature rooms. I find that a deviation of about 2 degrees or 3 degrees may double the time necessary for thorough crystal formation.

It seems desirable to give an indication of the time for crystal formation which has given me the best results. I find that it is possible when the proper temperature is attained for a given honey to bring a honey from a thoroughly liquid condition to a state in which the honey appears solid in a period as short as 34 hours. However, when working with exactly the same honey, a deviation of as small as two degrees F. may prolong the process to double the time.

Since speed of crystal formation is desirable not only from the point of view of the greatest possible utilization of the equipment but especially from the standpoint of the size of crystals and the quality of the processed honey, I find it desirable always to have a temperature which will allow crystal formation to an apparently solid honey to take not more than three or four days, and I have found that when a longer time is taken for this process the crystals are larger and the honey coarser and less desirable.

In order to produce the smooth grain and fondant-like consistency characteristic of my product, it is important to add very fine crystals to form the nuclei for further crystal formation, to thoroughly distribute them thru the liquid honey, and to control the temperature as described. If ordinary granulated honey is merely added to liquid honey, as has sometimes been done in the past to speed up granulation, the relatively coarse grain of ordinary granulated honey may result, and the honey will lack the consistency, smoothness and flavor characteristic of this new product. The difference is particularly marked where low grade honeys are used, and this process, by increasing their palatability, open up a wider market for low grade honeys.

After the honey has been granulated by the process here described, it can then be removed from the constant temperature to which it has been exposed and may then be kept at any ordinary temperature without liquefying. If the honey was too thin before processing, there will be a tendency for liquefying to occur if the temperature at which it is stored is somewhat higher than usually found in rooms suitable for human habitation, and on the other hand if the honey was quite thick, it may remain quite solid when stored in rooms as high in temperature as 80 degrees F.

In regard to the consistency of the honey used in my process, for best results I find it desirable to use honey which has a specific gravity of at least 1.42. If on the other hand the honey has too high a specific gravity, as for example, 1.44, the formation of crystals at constant temperature may be retarded, with consequent lowering of the quality of the final product, and also the heavier honeys may become so hard that they are less desirable for the common uses to which crystalline honeys may be put.

If honey prepared by my process is to be sold in a certain type of container, as for example, a tin can, it is desirable to place it in the containers immediately after the admixture of the finely crystallized honey and after the thorough mixing of this honey in the liquid honey. If this is done, the further formation of crystals takes place in the marketable container, and there is less probability of the incorporation of air. I find it preferable to run the honey into cans or bottles as soon as the mixing is complete and then to set the containers in a room at constant temperature.

Having described my invention, I claim

1. A fine grained, fondant-like honey product made by introducing fine crystalline nuclei of honey or other sugar into liquid honey at a temperature below the melting point of said nuclei, agitating the honey to thoroughly distribute said nuclei, and maintaining the temperature during the granulation of the honey within a few degrees of 57 degrees F.

2. A honey product made by heating honey to a temperature sufficient to destroy yeasts, quickly cooling it to a temperature below the melting point of honey crystals, introducing artificially prepared crystalline nuclei of fine grain, agitating the honey to distribute said nuclei uniformly thruout the honey, and controlling the temperature within a few degrees of 57 degrees F., whereby a fine grained, fondant-like honey product is formed.

3. A honey product made by heating honey to a temperature sufficient to destroy yeasts, quickly cooling it to a temperature below the melting point of honey crystals, introducing artificially prepared crystalline nuclei of fine grain, agitating the honey to distribute said nuclei uniformly thruout the honey, whipping minute air bubbles into the honey while it is partially crystallized, and controlling the temperature within a few degrees of 57 degrees Fahrenheit, whereby a fine grained, fondant-like honey product is formed.

4. A honey product made by heating honey to a temperature sufficient to destroy yeasts, quickly cooling it to a temperature below the melting point of honey crystals preferably about 75 degrees F., adding about 5% of fine grained crystalline honey or other fine grained sugar crystals to form nuclei of crystallization, agitating the honey to distribute said nuclei uniformly thruout the honey, and controlling the temperature within a few degrees of 57 degrees F., whereby a fine grained, fondant-like product is formed.

5. The process for producing a fine grained honey product which consists in heating honey to a temperature sufficient to destroy yeasts, quickly cooling it to a temperature below the melting point of honey crystals preferably about 75 degrees F., adding 5% of fine grained crystalline honey or other fine grained sugar crystals to form nuclei of crystallization, agitating the honey to distribute said nuclei uniformly thruout the honey, and controlling the temperature within a few degrees of 57 degrees F., during the period when the crystals are being formed.

6. The process for producing a fine grained honey product which consists in heating honey to a temperature sufficient to destroy yeasts, quickly cooling it to a temperature below the melting point of honey crystals preferably about 75 degrees F., adding 5% of fine grained crystalline honey or other fine grained sugar crystals to form nuclei of crystallization, agitating the honey to distribute said nuclei uniformly thruout the honey, whipping minute air bubbles into the honey while it is partially crystallized, and controlling the temperature within a few degrees of 57 degrees F., during the period when the crystals are being formed.

7. The method of processing honey which consists in heating honey to a temperature sufficient to destroy yeasts, lowering the temperature thereof to approximately 75 degrees F., adding to the cooled honey approximately 5% of granulated honey as a starter, agitating the honey to mix the same, then subjecting the honey mixture to a temperature of approximately 57 degrees F., for several days.

8. A honey product made by heating honey to a temperature sufficient to destroy yeasts, quickly cooling it to a temperature below the melting point of honey crystals preferably about 75 degrees F., adding from one to about 20% of fine grained crystalline honey or other fine grained sugar crystals to form nuclei of crystallization, agitating the honey to distribute said nuclei uniformly thruout the honey, and controlling the temperature within a few degrees of 57 degrees F., whereby a fine grained, fondant-like product is formed.

9. The process for producing a fine grained honey product, which consists in heating honey to a temperature sufficient to destroy yeasts, quickly cooling it to a temperature below the melting point of honey crystals preferably about 75 degrees F., adding from one to about 20% of fine grained crystalline honey or other fine grained sugar crystals to form nuclei of crystallization, agitating the honey to distribute said nuclei uniformly thruout the honey, and controlling the temperature within a few degrees of 57 degrees F., during the period when the crystals are being formed.

10. The process for producing a fine grained honey product, which consists in heating honey to a temperature sufficient to destroy yeasts, quickly cooling it to a temperature below the melting point of honey crystals preferably about 75 degrees F., adding from one to about 20% of fine grained crystalline honey or other fine grained sugar crystals to form nuclei of crystallization, agitating the honey to distribute said nuclei uniformly thruout the honey, whipping minute air bubbles into the honey while it is partially crystallized, and controlling the temperature within a few degrees of 57 degrees F., during the period when the crystals are being formed.

ELTON JAMES DYCE.